J. MILLER.
Floating Cover for Extract-Receivers.
No. 203,180. Patented April 30, 1878.
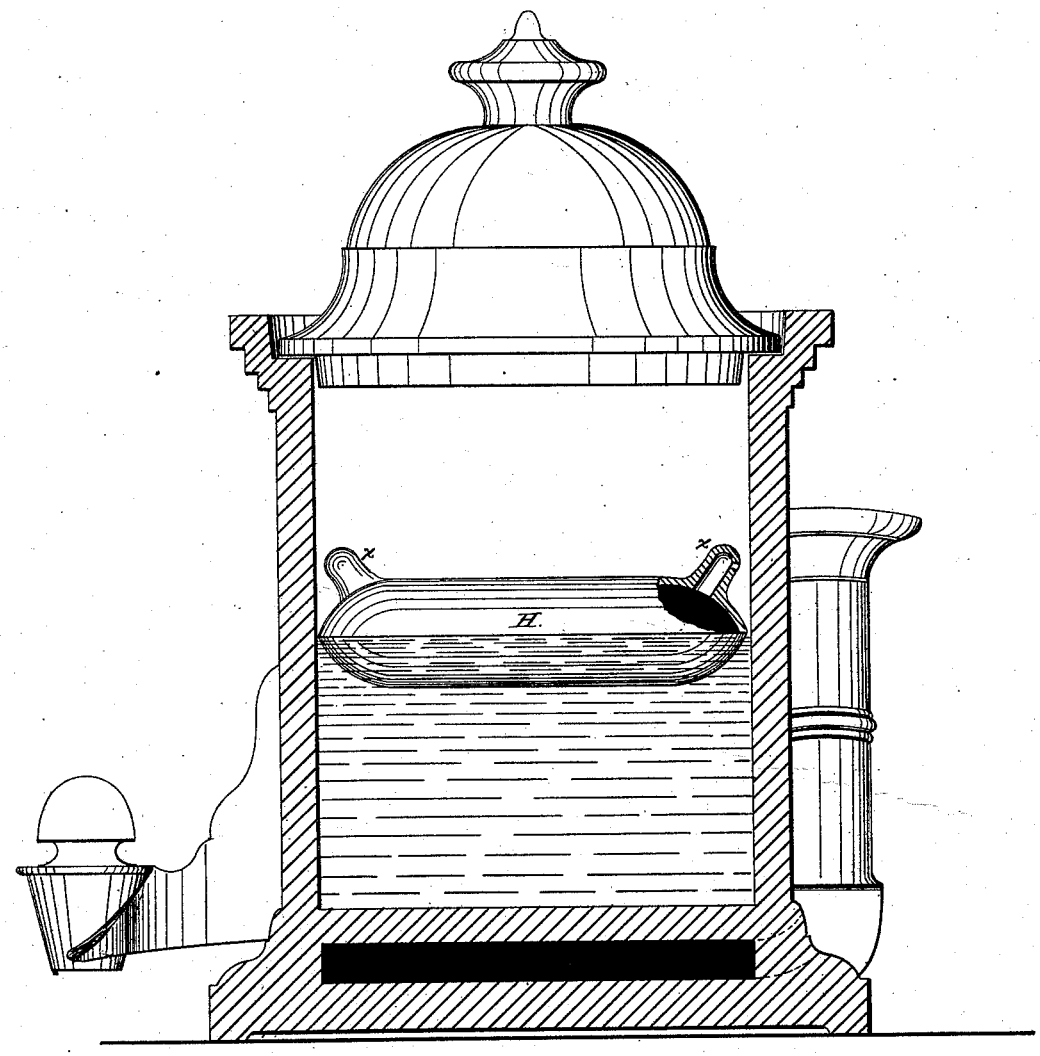

UNITED STATES PATENT OFFICE.

JONATHAN MILLER, OF HIMROD'S, NEW YORK, ASSIGNOR TO PRESSURE EXTRACT COMPANY, OF TRENTON, NEW JERSEY.

IMPROVEMENT IN FLOATING COVERS FOR EXTRACT-RECEIVERS.

Specification forming part of Letters Patent No. 203,180, dated April 30, 1878; application filed October 27, 1877.

*To all whom it may concern:*

Be it known that I, JONATHAN MILLER, of Himrod's, in the county of Yates and State of New York, have invented a new and Improved Floating Cover for Extract-Receivers; and I do hereby declare that the following is a full, clear, and exact description of the same, reference being had to the accompanying drawing, forming part of this specification.

The figure is a vertical section of an urn, with the cover shown floating on the surface of the liquid.

This invention consists in an automatically-adjustable cover for coffee-urns, or other analogous purposes, which floats upon the surface of the liquid, and by always preventing an exposure of the liquid surface, preserves the temperature of the liquid, prevents the rising of steam when hot liquids are used, stops evaporation, and obviates the objectionable circulation of currents (from convection) in the extract, all as hereinafter fully described.

In the drawing, H represents the floating cover, shown resting upon the surface of the liquid in a coffee-urn or other receptacle of extract. This float or cover is made hollow and bellied, so as to form an air-chamber, and is provided with one or more suitable air-vents to prevent rupture from expansion. These vents are preferably made in the form of tubes *x*, which form handles wherewith to lift the cover from the urn, the tubes being so arranged as to prevent, as far as possible, the admission of extract to the interior of the float, and yet permit the cover to be drained if liquid should gain access to the same. Said float may be constructed of metal, stoneware, or other suitable material, and corresponds to the shape of the urn in which it is placed.

The float is designed to be used more particularly for hot liquids, and when floating upon the top of the same acts as an automatically-adjustable cover, which, by preventing at all times the exposure of the surface, stops the uprising of the vapors, while the non-conducting body of air contained in the same prevents the loss of heat due to radiation.

This float tends also, when a constant heat is employed beneath the urn, to equalize the heat at the top and bottom of the liquid by preventing the cooling at the surface due to evaporation, and by thus retarding the circulating currents produced by convection, prevents the stirring or racking movement of the liquid, which tends to decompose the extract and detracts from the quality of the flavor.

By reason of this result coffee and all other extracts are preserved fresh for a greater length of time, and the tendency to become flat and insipid is correspondingly diminished.

While the float tends to keep hot liquids hot, it may be used also to preserve the low temperature of cooled liquids, and is applicable to various other liquids or extracts besides coffee.

Having thus described my invention, what I claim as new is—

The combination, with a receptacle for coffee or other liquid, of an automatically-adjustable floating cover, substantially as described, and for the purpose set forth.

JONATHAN MILLER.

Witnesses:
　EDWD. W. BYRN,
　CHAS. A. PETTIT.